(12) United States Patent
Wolfson et al.

(10) Patent No.: US 11,978,250 B2
(45) Date of Patent: May 7, 2024

(54) AGRICULTURAL CROP ESTIMATED DATE OF PLANTING

(71) Applicant: International Business Machines Corporation, Armonk, NY (US)

(72) Inventors: Charles Daniel Wolfson, Austin, TX (US); Kevin Brown, Eastleigh (GB); David Alec Selby, Fareham (GB); Hamish C. Hunt, Ashford (GB)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 17/303,543

(22) Filed: Jun. 2, 2021

(65) Prior Publication Data

US 2022/0391613 A1    Dec. 8, 2022

(51) Int. Cl.
*G06V 20/10* (2022.01)
*G06F 17/15* (2006.01)
*G06F 18/22* (2023.01)
*G06V 10/75* (2022.01)

(52) U.S. Cl.
CPC ............ *G06V 20/188* (2022.01); *G06F 17/15* (2013.01); *G06F 18/22* (2023.01); *G06V 10/751* (2022.01)

(58) Field of Classification Search
CPC .... G06V 10/751; G06V 20/188; G06V 20/13; G06F 18/22; G06F 17/15
See application file for complete search history.

(56) References Cited

U.S. PATENT DOCUMENTS

| | | | |
|---|---|---|---|
| 2016/0003790 | A1 | 1/2016 | Osborne |
| 2017/0105335 | A1 | 4/2017 | Xu |
| 2019/0014727 | A1 | 1/2019 | Rowan |
| 2019/0230873 | A1 | 8/2019 | Xu |

OTHER PUBLICATIONS

Durgun, Yetkin Özüm, et al. "Crop area mapping using 100-m Proba-V time series." Remote Sensing 8.7 (2016): 585. (Year: 2016).*

(Continued)

*Primary Examiner* — Vu Le
*Assistant Examiner* — Tracy Mangialaschi
(74) *Attorney, Agent, or Firm* — Stephanie L. Carusillo (57) ABSTRACT

In an approach for determining the date of planting of a crop growing in an agricultural field, a processor receives an aerial image of one or more agricultural fields in a pre-determined geographical region. A processor selects a plurality of points from the aerial image. A processor calculates a Vegetation Index of one or more crops growing at the plurality of points selected. A processor compares the Vegetation Index calculated for the one or more crops growing at the plurality of points selected to the Vegetation Index known for a plurality of historical reference signatures. A processor generates an actual signature. A processor cross-correlates the actual signature against the plurality of historical reference signatures to measure a degree of similarity. A processor identifies the one or more crops growing in the one or more agricultural fields in the pre-determined geographical region from the cross-correlation.

20 Claims, 4 Drawing Sheets

(56) References Cited

OTHER PUBLICATIONS

Guliyeva, Sona H. "Land cover/land use monitoring for agriculture features classification." The International Archives of the Photogrammetry, Remote Sensing and Spatial Information Sciences 43 (2020): 61-65. (Year: 2020).*

Thenkabail, Prasad, et al. "Spectral matching techniques to determine historical land-use/land-cover (LULC) and irrigated areas using time-series 0.1-degree AVHRR pathfinder datasets." Photogrammetric Engineering & Remote Sensing 73.10 (2007): 1029-1040. (Year: 2007).*

Dong, Taifeng, et al. "Field-scale crop seeding date estimation from MODIS data and growing degree days in Manitoba, Canada." Remote Sensing 11.15 (2019): 1760. (Year: 2019).*

Wikipedia, "Enhanced vegetation index", Wikipedia, Accessed on Jan. 29, 2021, 4 Pages.

\* cited by examiner

AGRICULTURAL CROP ESTIMATED DATE OF PLANTING

BACKGROUND OF THE INVENTION

The present invention relates generally to the field of data processing, and more particularly to determining the date of planting of a crop growing in an agricultural field using remote sensing data and cross-correlation.

Determination of the date of planting of a crop is key to monitoring crop growth because from the determination of the date of planting of a crop comes a wealth of knowledge regarding the crop's growth cycle, beginning with the preparation of the land and continuing through the planting, growth, pollination, senescence, and harvesting of the crop.

Determination of the date of planting of a crop is also key to assessing crop development. Farmers can use data produced from remote sensing to monitor soil moisture, to predict crop disease, and to identify areas of their fields where the crops may be underdeveloped. Remote sensing is the gathering of images of an area via remote sensors on satellites and aircrafts. The remote sensors detect changes in the physical characteristics of the area by measuring the area's reflected and emitted radiation. Using remote sensors is advantageous because the remote sensors provide uniform coverage of accessible in sometimes otherwise inaccessible areas. Further, with post processing, the images that are gathered by the remote sensors are timely, objective, and provide pertinent farm level information.

With the insights derived from the remote sensing images, farmers are able to implement timely interventions to ensure optimal yields at the end of the growing season. Additionally, by implementing timely interventions, farmers not only improve the productivity of their farms, but also reduce farm input costs and minimize environmental impacts. For example, provided with the necessary information, farmers can make an informed decision on what the correct type of fertilizer, pesticide, or herbicide is to apply to their crops and when to apply the fertilizer, pesticide, or herbicide.

The insights derived from the remote sensing images also enable farmers, as well as other people involved in the trading, pricing, and selling of crops who never actually set foot on a field, to estimate the projected crop yield. Information regarding crop health and development worldwide can be used to set prices and negotiate trade agreements. Traditionally, farmers and others have relied on products such as a crop assessment index to compare growth rates and productivity between years and to see how well each country's agricultural industry was producing.

SUMMARY

Aspects of an embodiment of the present invention disclose a method, computer program product, and computer system for determining the date of planting of a crop growing in an agricultural field. A processor receives an aerial image of one or more agricultural fields in a pre-determined geographical region. A processor selects a plurality of points from the aerial image across the one or more agricultural fields in the pre-determined geographical region. A processor clips the aerial image into one or more smaller images isolating the plurality of points selected across the one or more agricultural fields in the pre-determined geographical region. A processor calculates a Vegetation Index of one or more crops growing at the plurality of points selected across the one or more agricultural fields in the pre-determined geographical region. A processor compares the Vegetation Index calculated for the one or more crops growing at the plurality of points selected across the one or more agricultural fields in the pre-determined geographical region to the Vegetation Index known for a plurality of historical reference signatures. A processor determines a change in the Vegetation Index calculated for the one or more crops growing at the plurality of points selected across the one or more agricultural fields in the pre-determined geographical region. A processor generates an actual signature from one or more observed signatures. A processor cross-correlates the actual signature against the plurality of historical reference signatures to measure a degree of similarity between the actual signature and the plurality of historical reference signatures. A processor ranks one or more products of a cross-correlation of the actual signature against the plurality of historical reference signatures. A processor identifies the one or more crops growing in the one or more agricultural fields in the pre-determined geographical region from the cross-correlation of the actual signature against the plurality of historical reference signatures.

In some aspects of an embodiment of the present invention, prior to receiving the aerial image, a processor receives the one or more agricultural fields in the pre-determined geographical region inputted into a control file by a user through a user interface of a user computing device. A processor receives a specified period of time inputted into the control file by the user through the user interface of the user computing device. A processor processes the control file. A processor gathers field data recorded for the one or more agricultural fields in the pre-determined geographical region. A processor groups the field data recorded for the one or more agricultural fields in the pre-determined geographical region by crop type. A processor ascertains a known historical date of planting for the one or more crops growing in the one or more agricultural fields in the pre-determined geographical region from the field data. A processor produces the plurality of historical reference signatures from the grouped field data.

In some aspects of an embodiment of the present invention, subsequent to clipping the aerial image into one or more smaller images, a processor generates one or more observed signatures from the one or more smaller images isolating the plurality of points selected across the one or more agricultural fields in the pre-determined geographical region. A processor processes the one or more observed signatures.

In some aspects of an embodiment of the present invention, subsequent to identifying the one or more crops growing in the one or more agricultural fields in the pre-determines geographical region, a processor calculates a phase offset of the one or more crops identified as growing in the one or more agricultural fields in the pre-determined geographical region. A processor outputs information on the one or more crops identified as growing in the one or more agricultural fields in the pre-determined geographical region and an estimated date of planting of the one or more crops identified as growing in the one or more agricultural fields in the pre-determined geographical region. A processor stores the information on the one or more crops identified as growing in the one or more agricultural fields in the pre-determined geographical region and the estimated date of planting of the one or more crops identified as growing in the one or more agricultural fields in the pre-determined geographical region in a database.

In some aspects of an embodiment of the present invention, the aerial image of the one or more agricultural fields in the pre-determined geographical region is received from an optical Earth observation satellite or a non-optical Earth observation satellite at a pre-determined interval of time during a growing season of the one or more crops.

In some aspects of an embodiment of the present invention, the Vegetation Index is selected from the group consisting of a Normalized Difference Vegetation Index and an Enhanced Vegetation Index.

In some aspects of an embodiment of the present invention, the cross-correlation of the actual signature against the plurality of historical reference signatures is defined as $(f*g)(\tau) \triangleq \int_{-\infty}^{\infty} \overline{f(t)}g(t+\tau)dt$; $\overline{f(t)}$ denotes the complex conjugate of $f(t)$; and $\tau$ is a displacement.

In some aspects of an embodiment of the present invention, a processor produces a value from the cross-correlation of the actual signature against the plurality of historical reference signatures. A processor produces a phase angle from the cross-correlation of the actual signature against the plurality of historical reference signatures.

In some aspects of an embodiment of the present invention, the value produced from the cross-correlation of the actual signature against the plurality of historical reference signatures ranges from zero to one, wherein zero indicates no correlation and one indicates complete correlation between the actual signature and the plurality of historical reference signatures.

In some aspects of an embodiment of the present invention, the phase angle produced from the cross-correlation of the actual signature against the plurality of historical reference signatures is equal to a degree of shift, which indicates a number of days separating an estimated date of planting of the actual signature and an estimated date of planting of the plurality of historical reference signatures.

In some aspects of an embodiment of the present invention, the one or more crops identified as the one or more crops growing in the one or more agricultural fields in the pre-determined geographical region is a highest ranked cross-correlation product.

In some aspects of an embodiment of the present invention, the phase offset calculated for the one or more crops identified as growing in the one or more agricultural fields in the pre-determined geographical region is equal to how much the actual signature of the one or more crops identified as the one or more crops growing in the one or more agricultural fields in the pre-determined geographical region needs to be shifted with respect to the historical reference signature to achieve a highest correlation coefficient.

DETAILED DESCRIPTION

Embodiments of the present invention recognize that the determination of the date of planting of a crop is key to monitoring crop growth and development. From the determination of the date of planting of a crop comes an abundance of information regarding the crop's growth cycle and development that when properly utilized enables farmers to implement timely interventions to ensure optimal crop yields at the end of the growing season. This information not only helps farmers improve the productivity of their farms, but also reduce farm input costs and minimize environmental impacts. The determination of the date of planting of a crop also enables farmers, as well as other people involved in the trading, pricing, and selling of crops who never actually set foot on a field, to estimate the projected crop yield. This information is prized by those who trade, price, and sell crops because it is necessary when comparing growth rates and productivity between years, when setting prices, when negotiating trade agreements, and when anticipating market shifts. Thus, embodiments of the present invention recognize the need for an approach to gather recurrent information on a local and a global scale in a systematic way by non-destructive means and to compare the information to historical benchmark curves acquired over past growing seasons to determine the date of planting of a crop.

Embodiments of the present invention provide a system and method to gather field data recorded for one or more agricultural fields in a pre-determined geographical region (hereinafter referred to as the "area of interest") from maps produced by government agencies and from other resources and data available to the public. Embodiments of the present invention provide a system and method to produce a plurality of historical reference signatures composed of field data related to the crop type including historical benchmark curves and historical dates of planting acquired over past growing seasons.

Embodiments of the present invention provide a system and method to receive an aerial image from an optical Earth observation satellite (e.g., Sentinel-2, Moderate-Resolution Imaging Spectroradiometer, Advanced Spaceborne Thermal Emission and Reflection Radiometer, and Landsat) and/or from a non-optical Earth observation satellite (e.g., Sentinel-1).

The Copernicus Sentinel-2 mission (Sentinel-2) is a multispectral operational imaging mission in the Global Monitoring for Environment and Security program, which is jointly implemented by the European Commission and the European Space Agency. Sentinel-2 is comprised of a constellation of two-polar orbiting satellites, Sentinel-2A and Sentinel-2B. Sentinel-2A was launched by the European Space Agency on Jun. 23, 2015 and operates in a sun-synchronous orbit at an altitude of 786 km with a 10-day repeat cycle. Sentinel-2B was launched by the European Space Agency on Mar. 7, 2017 and is operational with data acquisitions available on Earth Explorer.

Sentinel-2A and Sentinel-2B operate together to acquire imagery of all of the Earth's land surfaces and coastal waters at high spatial resolution in a five-day period. Sentinel-2A and Sentinel-2B have a multi-spectral instrument (MSI), which measures the Earth's land surface reflectance in thirteen spectral bands ranging from Visible and Near-Infrared (VNIR) to Shortwave Infrared (SWIR) wavelengths along a 290-km orbital swath.

Land surface reflectance is the amount of light reflected by the surface of the Earth. It is a ratio of surface radiance to surface irradiance, and as such is unitless, with values between 0 and 1. Land surface reflectance provides for a comparison between multiple images over the same region and accounts for atmospheric effects such as aerosol scattering and thin clouds in the comparison images. For example, land surface reflectance is used when measuring the greenness of vegetation, which can also be used to determine phenological transition dates including the start of a season, the peak period of the season, and the end of the season. Land surface reflectance also provides the input for the generation of several land products such as Vegetation Indices.

The thirteen spectral bands of the MSI determine the level of spatial resolution. There are four VNIR bands (i.e., blue at 490 nm, green at 560 nm, red at 665 nm, and near-infrared at 842 nm) at 10 m resolution. There are six red-edge and shortwave infrared bands (i.e., four narrow bands for vegetation characterization at 705 nm, 740 nm, 783 nm, and 865 nm and two larger SWIR bands at 1,610 nm and 2,190 nm) at 20 m resolution. There are three cloud screening and atmospheric correction bands (i.e., 443 nm for aerosols, 945 nm for water vapor, and 1375 nm for cirrus detection) at 60 m resolution. The MSI captures multi-spectral satellite images of the Earth's land surfaces and coastal waters. From the multi-spectral images, data is extracted and used to monitor plant growth through the determination of various plant indices, to map changes in land cover, and to provide information on pollution in lakes and coastal waters, among other uses.

Moderate-Resolution Imaging Spectroradiometer (MODIS) is a high spatial resolution instrument aboard the Terra and Aqua satellites. Terra's orbit around the Earth is timed so that it passes from north to south across the equator in the morning, while Aqua passes south to north over the equator in the afternoon. Additionally, MODIS has a sweeping 2,330-km-wide viewing swath. Because of its positions on the Terra and Aqua satellites and because of its wide viewing swath, MODIS can view Earth's entire surface every 1 to 2 days, while acquiring data in 36 spectral bands.

Advanced Spaceborne Thermal Emission and Reflection Radiometer (ASTER) is a high spatial resolution instrument on the Terra satellite. ASTER can obtain high-resolution (i.e., 15 to 90 square meters per pixel) images of the Earth in 14 different wavelengths of the electromagnetic spectrum, ranging from visible to thermal infrared light. Unlike the other instruments aboard the Terra satellite, ASTER does not collect data continuously; rather, it collects an average of 8 minutes of data per orbit. All three ASTER telescopes (i.e., VNIR, SWIR, and TIR) are pointed in the cross-track direction. Given its high resolution and its ability to change viewing angles, ASTER can produce stereoscopic images and detailed terrain height models.

Landsat 8, originally called the Landsat Data Continuity Mission (LDCM), is an American Earth observation satellite. Landsat 8 is the eighth satellite in the Landsat program, the seventh to reach orbit successfully, and is a collaboration between NASA and the United States Geological Survey (USGS). Landsat 8 consists of two instruments—the Operational Land Imager (OLI) and the Thermal Infrared Sensor (TIRS). These two instruments provide seasonal coverage of the global landmass at a spatial resolution of 30 meters (visible, NIR, SWIR); 100 meters (thermal); and 15 meters (panchromatic). OLI is a push-broom sensor with a four-mirror telescope and 12-bit quantization. OLI collects data for visible, near infrared, and short-wave infrared spectral bands as well as for a panchromatic band. TIRS collects data for two more narrow spectral bands in the thermal region formerly covered by one wide spectral band on Landsat 4, 5, 6, and 7. The 100 m TIRS data is registered to the OLI data to create radiometrically, geometrically, and terrain-corrected 12-bit data products.

Landsat 8 orbits the Earth in a sun-synchronous, near-polar orbit, at an altitude of 705 km (i.e., 438 mi), inclined at 98.2 degrees, and completes one orbit around Earth every 99 minutes. Landsat 8 has a 16-day repeat cycle with an equatorial crossing time: 10:00 a.m.+/− 15 minutes. Landsat 8 is required to return 400 scenes per day to the USGS data archive. However, Landsat 8 has regularly been acquiring 725 scenes per day on the Worldwide Reference System-2 (WRS-2) path/row system, with a swath overlap varying from 7 percent at the equator to a maximum of approximately 85 percent at extreme latitudes. This increases the probability of capturing cloud-free scenes for the global landmass. The Landsat scene size is 185-km-cross-track-by-180-km-along track.

The Sentinel-1 mission (Sentinel-1) is comprised of a constellation of two polar-orbiting satellites, Sentinel-1A and Sentinel-1B. Sentinel-1A and Sentinel-1B have a C-band synthetic aperture radar (C-SAR) instrument which enables the satellites to acquire imagery day and night regardless of the weather. The C-SAR instrument provides 1 dB radiometric accuracy with a central frequency of 5.405 GHz. The C-SAR instrument has a spatial resolution of down to 5 m and a swath of up to 400 km. Sentinel-1A and Sentinel-1B are on a sun synchronous, near polar) (98.18°) orbit. The orbit has a 12-day repeat cycle and completes 175 orbits per cycle.

Sentinel-1 produces Synthetic Aperture Radar (SAR) data. SAR data provides information different from that of optical sensors operating in the visible and infrared regions of the electromagnetic spectrum. SAR data includes satellite-transmitted and received radar scans of the Earth's surface. SAR data consists of high-resolution reflected returns of radar-frequency energy from terrain that has been illuminated by a directed beam of pulses generated by a sensor. The radar returns from the terrain are mainly determined by the physical characteristics of the surface features such as surface roughness, geometric structure, and orientation, the electrical characteristics such as the dielectric constant, moisture content, and conductivity, and the radar frequency of the sensor.

Embodiments of the present invention provide a system and method to determine if there is a change in the Vegetation Index of the crop(s) growing at a plurality of points captured in one or more observed signatures.

A Vegetation Index is a spectral calculation of two or more bands of light. A Vegetation Index is designed to maximize sensitivity to the vegetation characteristics while minimizing confounding factors such as soil background reflectance, directional, or atmospheric effects. By doing so, the Vegetation Index highlights vegetation's properties and allows reliable spatial and temporal inter-comparisons of terrestrial photosynthetic activity and canopy structural variations.

The Normalized Difference Vegetation Index (NDVI) is an indicator of photosynthetically active biomass and is used when calculating vegetation health. The NDVI allows for visualizing vegetated areas, differentiating vegetation from other types of land cover (i.e., artificial land covers), determining the vegetation's overall state, and detecting abnormal changes in the vegetation's growth process.

The NDVI quantifies the density of plant growth on Earth. To determine the density of plant growth, researchers observe the distinct colors (i.e., the wavelengths) of visible and near-infrared sunlight reflected by the plants. When sunlight strikes an object, certain wavelengths of the spectrum are absorbed, and other wavelengths are reflected. The pigment in a plant's leaves (i.e., chlorophyll) strongly absorb the visible light (i.e., from 0.4 to 0.7 μm). The cell structure of the plant's leaves, on the other hand, strongly reflects near-infrared light (from 0.7 to 1.1 μm). The more leaves a plant has, the more these wavelengths of light are affected, respectively. Once this information is collected, researchers can quantify the photosynthetic capacity of the vegetation in a given pixel of land surface.

The NDVI quantifies the density of plant growth on Earth in ratio format—near-infrared radiation $\rho_{nir}$ minus visible radiation $\rho_{red}$ divided by near-infrared radiation $\rho_{nir}$ plus visible radiation $\rho_{red}$. Written mathematically, the formula for NDVI is:

$$NDVI = \frac{\rho_{nir} - \rho_{red}}{\rho_{nir} + \rho_{red}}$$

and can be rewritten as:

$$NDVI = \frac{\frac{\rho_{nir}}{\rho_{red}^{-1}}}{\frac{\rho_{nir}}{\rho_{red}^{+1}}}$$

The Enhanced Vegetation Index (EVI) is a modified NDVI with improved sensitivity to high biomass regions and improved vegetation monitoring capabilities. The EVI incorporates both a de-coupling of the canopy background signal and a reduction in atmospheric influences.

The EVI corrects for some atmospheric conditions and canopy background noise and is more sensitive in areas with dense vegetation. The EVI incorporates an "L" value to adjust for canopy background noise and "C" values as coefficients for atmospheric resistance. Additionally, the EVI builds on the pigment absorption feature in the red (600 nm), blue (450 nm), and near-infrared (860 nm) regions of the electromagnetic spectrum. These enhancements allow for a calculation of the EVI as a ratio between the $\rho_{red}$ and $\rho_{nir}$ values as well as a reduction in canopy background noise, atmospheric noise, and saturation.

Written mathematically, the formula to calculate the EVI is:

$$EVI = G \times \frac{\rho_{nir} - \rho_{red}}{\rho_{nir} + (C_1 \times \rho_{red} - C_2 \times \rho_{blue}) + L}$$

and can be rewritten as:

$$EVI = G \times \frac{\frac{\rho_{nir}}{\rho_{red}^{-1}}}{\frac{\rho_{nir}}{\rho_{red}} + \left(C_1 - C_2 \times \frac{\rho_{blue}}{\rho_{red}}\right) + \frac{L}{\rho_{red}}}$$

where L is a soil adjustment factor, and $C_1$ and $C_2$ are coefficients used to correct aerosol scattering in the red band by the use of the blue band. The $\rho_{blue}$, $\rho_{red}$, and $\rho_{nir}$ represent reflectance at the blue (0.45-0.52 μm), red (0.6-0.7 μm), and Near-Infrared wavelengths (0.7-1.1 μm), respectively. In general, G=2.5, $C_1$=6.0, $C_2$=7.5, and L=1.

Embodiments of the present invention provide a system and method to determine the date of planting of the crop growing at the plurality of points selected across the area of interest based on a cross-correlation of the actual crop signature against the plurality of historical reference signatures. Cross-correlation is a measurement that tracks the movements of two or more sets of time series data relative to one another. Cross-correlation is used to compare multiple time series and objectively determine how well they match up with each other and, in particular, at what point the best match occurs. More specifically, cross-correlation refers to the correlation between the entry of two random vectors X and Y. If each of the random vectors X and Y are a scalar random variable that is realized repeatedly in a time series, then the correlations of the various temporal instances of X are known as autocorrelations of X, and the cross-correlations of X with Y across time are temporal cross-correlations. The definition of a correlation includes a standardizing factor in such a way that correlations have a value between −1 and +1. The closer the cross-correlation value is to +1, the more closely the sets are identical. If X and Y are two independent random variables with probability density functions $f$ and g, respectively, then the probability density of the difference Y-X is formally given by the cross-correlation ($f*g$); however, this terminology is not used in probability and statistics.

For continuous functions $f$ and g, the cross-correlation is defined as: ≜
which is equivalent to: ≜
where $\overline{f(t)}$ denotes the complex conjugate of $f(t)$, and τ is the displacement, also known as lag (a feature in $f$ at t occurs in g at t+τ).

If $f$ and g are both continuous periodic functions of period T, the integration from −∞ to ∞ is replaced by integration over any interval $[t_0, t_0+T]$ of length T: ≜
which is equivalent to: ≜

For example, a cross-correlation may be used to find out how much g must be shifted along the x-axis to make it identical to $f$ if the two real value functions $f$ and g differ only by an unknown shift along the x-axis. The formula slides the g function along the x-axis, calculating the integral of their product at each position. When the functions match, the value of ($f*g$) is maximized.

Implementation of embodiments of the present invention may take a variety of forms, and exemplary implementation details are discussed subsequently with reference to the Figures.

Figure 1:
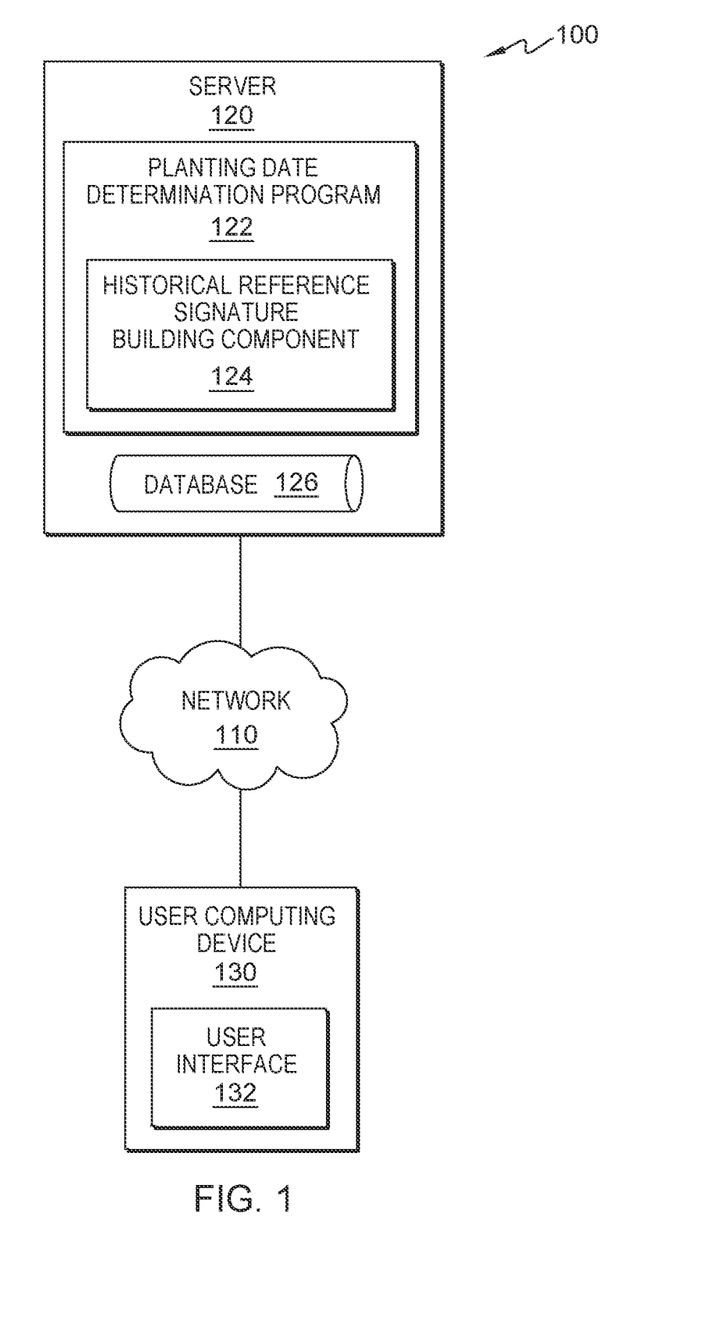
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In the depicted embodiment, distributed data processing environment 100 includes server 120 and user device computing device 130, interconnected over network 110. Distributed data processing environment 100 may include additional servers, computers, computing devices, IoT sensors, and other devices not shown. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run planting date determination program 122 and to send and/or store data in database 126. In an embodiment, server 120 can send data from database 126 to user computing device 130. In an embodiment, server 120 can receive data in database 126 from user computing device 130. In one or more embodiments, server 120 can be a standalone computing device, a management server, a web server, a mobile computing device, or any other electronic device or computing system capable of receiving, sending, and processing data. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 4.

Planting date determination program 122 operates to determine the date of planting of the crop growing at the plurality of points selected across the area of interest based on a cross-correlation of the actual crop signature against a plurality of historical reference signatures. In the depicted embodiment, planting date determination program 122 contains historical reference signature building component 124, which operates to produce a plurality of historical reference signatures composed of field data gathered from maps produced by government agencies and from other resources and data available to the public. In the depicted embodiment, planting date determination program 122 is a standalone program. In another embodiment, planting date determination program 122 may be integrated into another software product. In the depicted embodiment, planting date determination program 122 resides on server 120. In other embodiments, planting date determination program 122 may reside on user computing device 130 or on another computing device (not shown), provided that planting date determination program 122 has access to network 110.

Figure 2:
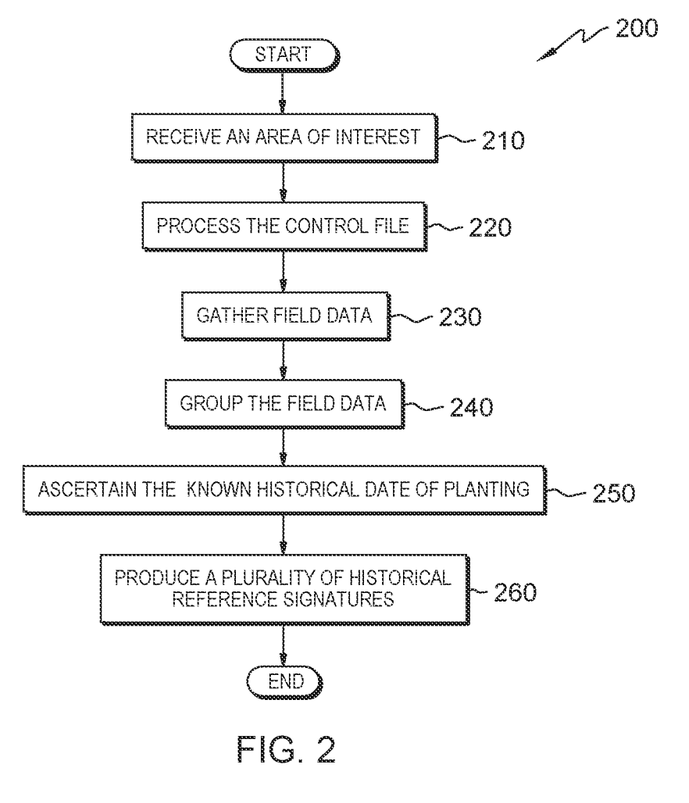
FIG. 2 is a flowchart depicting the operational steps of a historical reference signature building component of a planting date determination program in a distributed data processing environment, such as the one depicted in FIG. 1, in accordance with an embodiment of the present invention.

The operational steps of historical reference signature building component 124 of planting date determination program 122 are depicted and described in further detail with respect to FIG. 2. The operational steps of planting date determination program 122 are depicted and described in further detail with respect to FIG. 3.

Database 126 operates as a repository for data received, used, and/or generated by planting date determination program 122. A database is an organized collection of data. Data includes, but is not limited to, field data and any other data received, used, and/or generated by planting date determination program 122.

Field data includes, but is not limited to, (a) agricultural field identifying data (e.g., acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range); (b) agricultural crop harvest data (e.g., crop type, crop variety, crop rotation, harvest date, Actual Production History (APH), expected yield, yield, crop price, crop revenue, grain moisture, tillage practice, and previous growing season information); (c) soil data (e.g., type, composition, pH, organic matter (OM), cation exchange capacity (CEC)); (d) planting data (e.g., planting date, seed(s) type, relative maturity (RM) of planted seed(s), seed population; (e) fertilizer data (e.g., nutrient type (Nitrogen, Phosphorous, Potassium), application type, application data, amount, source, method); (f) pesticide data (e.g., pesticide, herbicide, fungicide, other substance or mixture of substances intended for use as a plant regulator, defoliant, or desiccant, application date, amount, source, method); (g) irrigation data (e.g., application date, amount, source, method); (h) weather data (e.g., precipitation, temperature, wind, forecast, pressure, visibility, clouds, heat index, dew point, humidity, snow depth, air quality, sunrise, sunset); and (i) imagery data (e.g., imagery and light spectrum information from an agricultural apparatus sensor, camera, computer, smartphone, tablet, unmanned aerial vehicle, planes or satellite).

Database 126 can be implemented with any type of device capable of storing data and configuration files that can be accessed and utilized by server 120, such as a hard disk drive, a database server, or a flash memory. In an embodiment, database 126 is accessed by planting date determination program 122 to store and/or to access the data. In the depicted embodiment, database 126 resides on server 120. In another embodiment, database 126 may reside on another computing device, server, cloud server, or spread across multiple devices elsewhere (not shown) within distributed data processing environment 100, provided that planting date determination program 122 has access to database 126.

User computing device 130 operates to run user interface 132 through which a user can interact with planting date determination program 122 on server 120. In an embodiment, user computing device 130 is a device that performs programmable instructions. For example, user computing device 130 may be an electronic device, such as laptop computer, a tablet computer, a netbook computer, a personal computer, a desktop computer, a smart phone, or any programmable electronic device capable of running user interface 132 and communicating (i.e., sending data to and receiving data from) with planting date determination program 122 via network 110. In general, user computing device 130 represents any programmable electronic device or a combination of programmable electronic devices capable of executing machine readable instructions and communication with other communicating devices (not shown) within distributed data processing environment 100 via network 110. In the depicted embodiment, user computing device 130 includes an instance of user interface 132. User computing device 130 may include components as described in further detail in FIG. 4.

User interface 132 operates as a local user interface between planting date determination program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from planting date determination program 122 to a user via network 110. User interface 132 can also display or present outputs including information (such as graphics, text, and/or sound) sent from planting date determination program 122 to a user via network 110. In an embodiment, user interface 132 is capable of sending and receiving data (i.e., to and from planting date determination program 122 via network 110, respectively). Through user interface 132, a user can enter a task to analyze an area of interest, and/or receive outputted information on the estimated planting date of the crop growing in the area of interest.

As used herein, a user is any individual who is looking to determine the date of planting of the crop growing in the area of interest. For example, a user may be a brewing company checking to see when and how much barley will be available for the company to purchase for the company's brewing process. In another example, a user may be a food processing factory preparing to fulfill supply orders for crops. In another example, a user may be a government agency preparing charts and maps illustrating crop acreage, crop yields, crop areas harvested, and other crop production information. In another example, a user may be a buyer who is assessing the agricultural fields in a geographical region to analyze the agricultural fields' historic and current usages and to predict future crop yields from which the buyer can predict expenses and income of operating an agricultural field. In another example, a user may be an insurer who is analyzing an agricultural field's historic and current usage to create or monitor a customized insurance policy.

FIG. 2 is a flowchart, generally designated 200, depicting the operational steps of historical reference signature building component 124 of planting date determination program 122 on server 120 in distributed data processing environment 100 of FIG. 1, in accordance with an embodiment of the present invention. In an embodiment, historical reference signature building component 124 operates to produce a plurality of historical reference signatures composed of field data gathered from maps produced by government agencies and from other resources and data available to the public. It should be appreciated that the process depicted in FIG. 2 illustrates one possible iteration of the process flow, which may be repeated for each area of interest received by planting date determination program 122.

In step 210, historical reference signature building component 124 receives an area of interest. In an embodiment, historical reference signature building component 124 receives an area of interest inputted into a control file by a user through user interface 132 of user computing device 130. In an embodiment, historical reference signature building component 124 receives a specified period of time. In an embodiment, historical reference signature building component 124 receives a specified period of time inputted into a control file by a user through user interface 132 of user computing device.

For example, a user, a data scientist who works for an agricultural company, is asked to determine the date of planting of the food crops growing in Central Europe during the current growing season which runs from March $1^{st}$ to August $31^{st}$. The data scientist inputs the area of interest, Central Europe, and the specified period of time, March $1^{st}$ to August $31^{st}$, into a control file, initiating the request for planting date determination program 122 to determine the date of planting of the food crops using user interface 132 of user computing device 130.

In step 220, historical reference signature building component 124 processes the control file. In an embodiment, historical reference signature building component 124 processes the control file containing the area of interest and the specified period of time. In an embodiment, historical reference signature building component 124 processes the control file to complete the user's request to determine the date of planting of the crop growing in the area of interest during the specified period of time. In an embodiment, responsive to historical reference signature building component 124 receiving an area of interest, historical reference signature processes the control file.

In step 230, historical reference signature building component 124 gathers field data. In an embodiment, historical reference signature building component 124 gathers field data recorded for the area of interest. In an embodiment, historical reference signature building component 124 gathers field data, including, but not limited to, agricultural field identifying data, agricultural crop harvest data, and planting data. For example, historical reference signature building component 124 gathers field data recorded for the area of interest, Central Europe, during the specified period of time, March $1^{st}$ to August $31^{st}$. This includes data for food crops such as corn, wheat, rice, grain, sorghum, barley, oats, and rye.

In one or more embodiments, historical reference signature building component 124 gathers field data including historical data indicative of changes in the Vegetation Index over a specified period of time (i.e., over a growing season). In one or more embodiments, historical reference signature building component 124 gathers field data including historical benchmark curves acquired over past growing seasons that correspond to known crops with known plant dates. In an embodiment, historical reference signature building component 124 gathers field data from maps produced by government agencies. In one or more embodiments, historical reference signature building component 124 gathers field data from other resources and data available to the public. In an embodiment, responsive to historical reference signature building component 124 processing the control file, historical reference signature building component 124 gathers field data.

In step 240, historical reference signature building component 124 groups the field data. In an embodiment, historical reference signature building component 124 groups the field data recorded for the area of interest. In an embodiment, historical reference signature building component 124 groups the field data recorded for the area of interest by crop type. In one or more embodiments, historical reference signature building component 124 groups the field data by agricultural field.

In an embodiment, historical reference signature building component 124 finds the crop rotation patterns for the one or more agricultural fields in the area of interest. Crop rotation patterns are chosen based on finite patterns but are varied based on the future market for a given crop. The future market for a given crop creates variance. In an embodiment, historical reference signature building component 124 determines the future market for one or more crops. In an embodiment, historical reference signature building component 124 predicts the type of crop that is most likely growing in the one or more agricultural fields in the area of interest during the specified period of time based on the crop rotation pattern and the future market for one or more crops.

In an embodiment, historical reference signature building component 124 removes outlier observations from the historical benchmark curves recorded for the one or more agricultural fields in the area of interest. In an embodiment, historical reference signature building component 124 removes outlier observations from the historical benchmark curves recorded for the one or more agricultural fields in the area of interest in order to produce a cleaner historical reference signature. In an embodiment, responsive to historical reference signature building component 124 gathering field data, historical reference signature building component 124 groups the field data.

In step 250, historical reference signature building component 124 ascertains the known historical date of planting. In an embodiment, historical reference signature building component 124 ascertains the known historical date of planting for each crop type grown in the area of interest. In an embodiment, historical reference signature building component 124 ascertains the known historical date of planting for each crop type grown in the area of interest from the field data gathered from the maps produced by government agencies and from the other resources and data available to the public. In an embodiment, responsive to historical reference signature building component 124 grouping the field data, historical reference signature building component 124 ascertains the known historical date of planting for each crop type grown in the area of interest.

In step 260, historical reference signature building component 124 produces a plurality of historical reference signatures. A historical reference signature is a datum of observation points of a known crop. Each observation point represents a value observed by a satellite. The observation points from a plurality of historical reference signatures are used by the ML to identify the crop type grown in the area of interest. A historical reference signature is also comprised of field data related to the crop type, including, but not limited to, historical benchmark curves and historical dates of planting acquired over past growing seasons. In an embodiment, historical reference signature building component 124 produces a plurality of historical reference signatures for each crop type grown in the area of interest. In an embodiment, responsive to historical reference signature building component 124 ascertaining the known historical date of planting, historical reference signature building component 124 produces a plurality of historical reference signatures.

Figure 3:
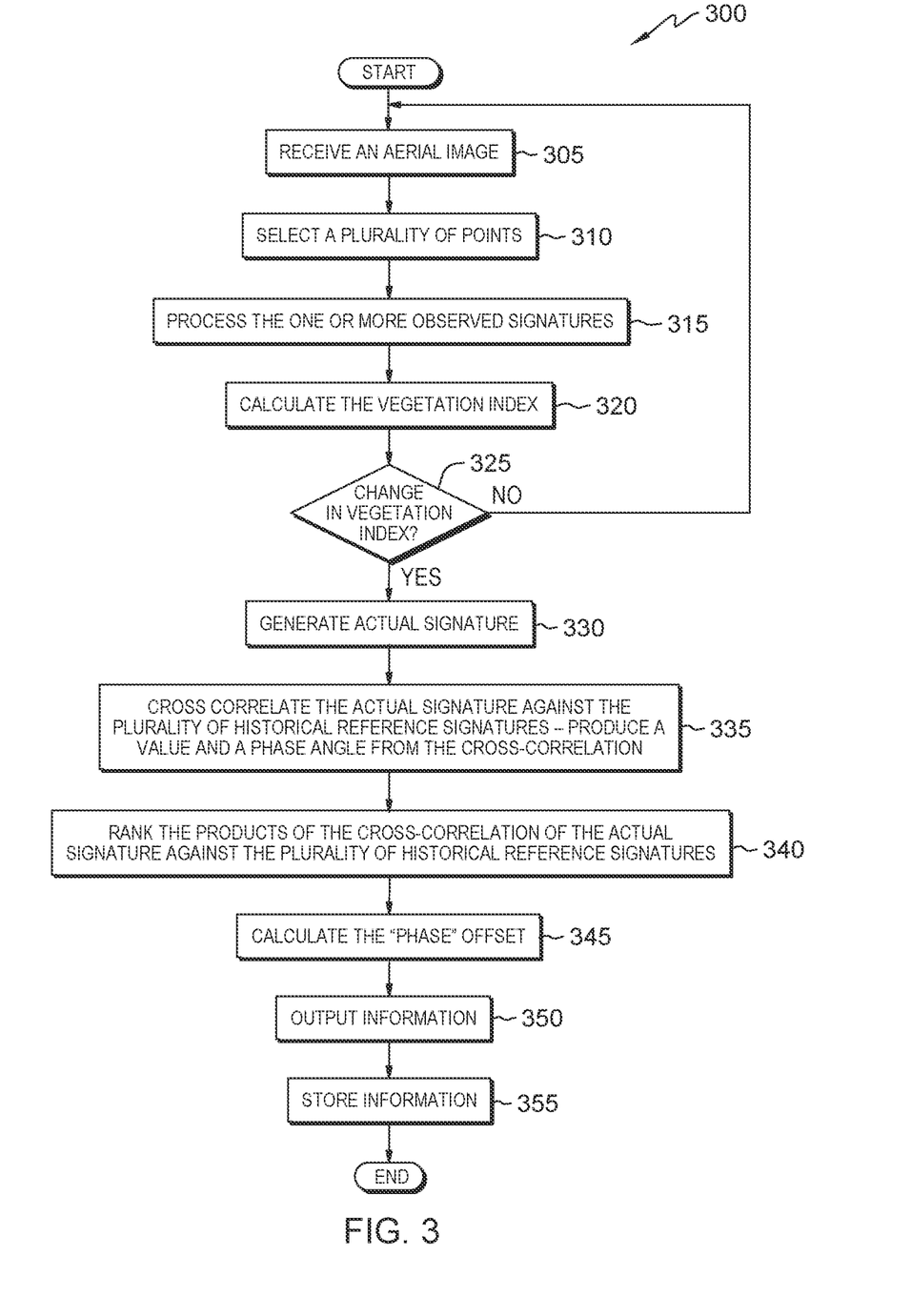
FIG. 3 is a flowchart depicting the operational steps of a planting date determination program in a distributed data processing environment, such as the one depicted in FIG. 1, in accordance with an embodiment of the present invention.

FIG. 3 is a flowchart, generally designated 300, depicting the operational steps of planting date determination program 122 on server 120 in distributed data processing environment 100 of FIG. 1, in accordance with an embodiment of the present invention. In an embodiment, planting date determination program 122 operates to receives an aerial image of the area of interest from an optical Earth observation satellite and/or from a non-optical Earth observation satellite. In an embodiment, planting date determination program 122 operates to determine if there is a change in the Vegetation Index of the crops growing at the plurality of points captured in the one or more observed signatures. In an embodiment, planting date determination program 122 operates to generate an actual signature for the area of interest. In an embodiment, planting date determination program 122 operates to determine the date of planting of the crop in the area of interest based on a cross-correlation of the actual signature with the plurality of historical reference signatures. It should be appreciated that the process depicted in FIG. 3 illustrates one possible iteration of the process flow, which may be repeated for each aerial image of the area of interest received by planting date determination program 122.

In step 305, planting date determination program 122 receives an aerial image. In an embodiment, planting date determination program 122 receives an aerial image of the area of interest. In an embodiment, planting date determination program 122 receives an aerial image of the area of interest from an Earth observation satellite. In an embodiment, planting date determination program 122 receives an aerial image of the area of interest from an optical Earth observation satellite such as Sentinel-2, MODIS, ASTER, or Landsat. In one or more embodiments, planting date determination program 122 receives an aerial image of the area of interest from a non-optical Earth observation satellite such as Sentinel-1. In an embodiment, planting date determination program 122 receives an aerial image of the area of interest during the specified period of time, i.e., beginning as soon as possible after the crop emerges and continuing until the crop is harvested, e.g., March $1^{st}$ until August $31^{st}$. In an embodiment, planting date determination program 122 receives an aerial image of the area of interest at a predetermined interval of time, e.g., every five days for X number of days.

In step 310, planting date determination program 122 selects a plurality of points. In an embodiment, planting date determination program 122 selects a plurality of points across the area of interest. The number of points selected is dependent on the overall acreage of the area of interest. In an embodiment, planting date determination program 122 selects a plurality of points across the area of interest at random. In an embodiment, planting date determination program 122 selects a plurality of points across the area of interest at a fixed distance from another point. The fixed distance from the other point is dependent on the overall acreage of the area of interest. Each point represents a sample of a crop growing in the area of interest.

In an embodiment, planting date determination program 122 clips the aerial image. In an embodiment, planting date determination program 122 clips the aerial image into one or more smaller images. In an embodiment, planting date determination program 122 clips the aerial image into one or more smaller images in order to isolate the areas that contain the plurality of points. The one or more smaller images generated through the clipping process will hereinafter be referred to as the "one or more observed signatures". In an embodiment, responsive to planting date determination program 122 receiving an aerial image, planting date determination program 122 selects a plurality of points.

In step 315, planting date determination program 122 processes the one or more observed signatures. In an embodiment, planting date determination program 122 processes the one or more observed signatures in the same manner as historical reference signature building component 124 process the control file containing the area of interest and the specified period of time in step 220 (i.e., comparing like-for-like, e.g., historical reference signature building component 124 builds a reference signature using EVI, therefore planting date determination program 122 must compare signatures using EVI). In an embodiment, planting date determination program 122 processes the one or more observed signatures in order to detect and to remove clouds and shadows present at the pixel level. The presence of clouds and shadows in remotely sensed images will distort the results of a change analysis. In an embodiment, responsive to planting date determination program 122 selecting a plurality of points, planting date determination program 122 processes the one or more observed signatures.

In step 320, planting date determination program 122 calculates the Vegetation Index. In an embodiment, planting date determination program 122 calculates the Vegetation Index of the crop(s) growing at the plurality of points captured in the one or more observed signatures. In an embodiment, planting date determination program 122 calculates the NDVI of the crop(s) growing at the plurality of points captured in the one or more observed signatures. In one or more embodiments, planting date determination program 122 calculates the EVI of the crop(s) growing at the plurality of points captured in the one or more observed signatures.

In an embodiment, planting date determination program 122 plots the calculated Vegetation Index. In an embodiment, planting date determination program 122 plots the calculated Vegetation Index on a line graph. In an embodiment, planting date determination program 122 plots the calculated Vegetation Index to differentiate the crops growing at the plurality of points captured in the one or more observed signatures. Each line of the line graph represents the crop growing at one point of the plurality of points. In an embodiment, planting date determination program 122 tunes out the noise between the plotted points in order to get fairly pure lines. In an embodiment, responsive to planting date determination program 122 processing the one or more observed signatures, planting date determination program 122 calculates the Vegetation Index.

For example, barley is being grown at one point of the plurality of points. Wheat, flax, and oilseed crops are being grown at other points of the plurality of points. Planting date determination program 122 calculates the Vegetation Index of these crops and plots the calculated Vegetation Indices on the line graph.

In decision 325, planting date determination program 122 determines if there is a change in the Vegetation Index. In an embodiment, planting date determination program 122 determines if there is a change in the Vegetation Index of the crop(s) growing at the plurality of points captured in the one or more observed signatures. In an embodiment, responsive to planting date determination program 122 calculating the Vegetation Index, planting date determination program 122 determines if there is a change in the Vegetation Index.

In an embodiment, planting date determination program 122 determines if there is a change in the Vegetation Index by comparing the calculated Vegetation Index of the crop(s) growing at the plurality of points captured in the one or more observed signatures to the Vegetation Index of the plurality of historical reference signatures, as determined in FIG. 2. In an embodiment, planting date determination program 122 determines there is a change in the Vegetation Index when the Vegetation Index of the crop(s) growing at the plurality of points captured in the one or more observed signatures departs from a threshold value. The threshold value is set at and is equivalent to the Vegetation Index of the plurality of historical reference signatures.

If planting date determination program 122 determines there is no change in the Vegetation Index (decision 325, NO branch), then planting date determination program 122 waits until another aerial image is received (step 305). In an embodiment, planting date determination program 122 stores the one or more observed signatures in a database, e.g., database 126. In an embodiment, planting date determination program 122 builds up the observed signature in the vector by increasing the length of the vector in storage for the season. If planting date determination program 122 determines there is a change in the Vegetation Index (decision 325, YES branch), then planting date determination program 122 proceeds to step 330, generating an actual signature.

In step 330, planting date determination program 122 generates an actual signature. In an embodiment, planting date determination program 122 generates an actual signature from the one or more observed signatures. The actual signature is a cumulative representation of the one or more observed signatures. In an embodiment, responsive to planting date determination program 122 determining there is a change in the Vegetation Index, planting date determination program 122 generates an actual signature.

In step 335, planting date determination program 122 cross-correlates the actual signature against the plurality of historical reference signatures. In an embodiment, planting date determination program 122 cross-correlates, as described above, the actual signature against the plurality of historical reference signatures to measure the degree of correlation between the signatures. In an embodiment, planting date determination program 122 produces a value from the cross-correlation of the actual signature against the plurality of historical reference signatures. The value produced is equal to the degree of correlation between the actual signature against the plurality of historical reference signatures. The value produced from the cross-correlation ranges from 0 to 1 indicating no correlation to complete correlation, respectively, between the signatures.

In an embodiment, planting date determination program 122 produces a phase angle from the cross-correlation of the actual signature against the plurality of historical reference signatures. The phase angle produced is equal to the degree of the shift between the actual signature and the plurality of historical reference signatures. In other words, the phase angle is equal to the number of days the actual signature is offset from the plurality of historical reference signatures. In an embodiment, responsive to planting date determination program 122 generating an actual signature, planting date determination program 122 cross-correlates the actual signature against the plurality of historical reference signatures.

In step 340, planting date determination program 122 ranks the products of the cross-correlation of the actual signature against the plurality of historical reference signatures. In an embodiment, planting date determination program 122 ranks the products of the cross-correlation of the actual signature against the plurality of historical reference signatures based on the value produced from the cross-correlation, i.e., ranks the cross-correlated actual signatures and historical reference signatures from no correlation to complete correlation, e.g., the actual signature that completely correlates with a historical reference signature ranks higher than the actual signature that is not correlated with a historical reference signature. In an embodiment, planting date determination program 122 ranks the products of the cross-correlation of the actual signature against the plurality of historical reference signatures to identify the crop growing in the area of interest. The highest ranked cross-correlation product (i.e., the historical reference signature that best matches the actual signature) is the crop determined to most likely be growing in the area of interest. The crop most likely growing in the area of interest will hereinafter be referred to as the winning crop.

In some embodiments, planting date determination program 122 selects the best estimate or fit if one or more products of the cross-correlation of the actual signature against the plurality of historical reference signatures produces the same value and, therefore, are tied for the same rank (e.g., tied for the highest ranking).

In an embodiment, planting date determination program 122 calculates the average of the cross-correlation products. In an embodiment, planting date determination program 122 calculates the average of the cross-correlation products in order to eliminate variances in the observed values of the cross-correlation products.

In an embodiment, responsive to planting date determination program 122 cross-correlating the actual signature against the plurality of historical reference signatures, planting date determination program 122 ranks the results of the cross-correlation of the actual signature against the plurality of historical reference signatures.

In step 345, planting date determination program 122 calculates the "phase" offset. In an embodiment, planting date determination program 122 calculates the "phase" offset of the actual signature of the winning crop from the historical reference signature. The "phase" offset of the actual signature of the winning crop is a measurement of how much the actual signature of the winning crop has to be shifted with respect to the historical reference signature to achieve the highest correlation coefficient, e.g., a measurement of the number of days separating the date of planting of the winning crop and the date of planting of the historical reference crop, e.g., a measurement of where the winning crop is and where the historical reference crop would be in the growth process. In an embodiment, planting date determination program 122 calculates the phase offset of the winning crop using the phase angle produced from the cross-correlation of the actual signature against the plurality of historical reference signatures. In an embodiment, planting date determination program 122 calculates the phase offset from the known date of planting of the historical reference signature. In an embodiment, responsive to planting date determination program 122 ranking the results of the cross-correlation of the actual signature against the plurality of historical reference signatures, planting date determination program 122 calculates the phase offset.

In step 350, planting date determination program 122 outputs information. In an embodiment, planting date determination program 122 outputs information on the identification of the winning crop and the estimated date of planting of the winning crop. In an embodiment, planting date determination program 122 outputs information on the identification of the winning crop and the estimated date of planting of the winning crop to the user through user interface 132 of user computing device 130. In an embodiment, responsive to planting date determination program 122 calculating the offset, planting date determination program 122 outputs information.

In step 355, planting date determination program 122 stores the information. In an embodiment, planting date determination program 122 stores the information on the identification of the winning crop and the estimated date of planting of the winning crop. In an embodiment, planting date determination program 122 stores the information on the identification of the winning crop and the estimated date of planting of the winning crop in a database, e.g., database 126. In an embodiment, responsive to planting date determination program 122 outputting information, planting date determination program 122 stores the information.

Figure 4:
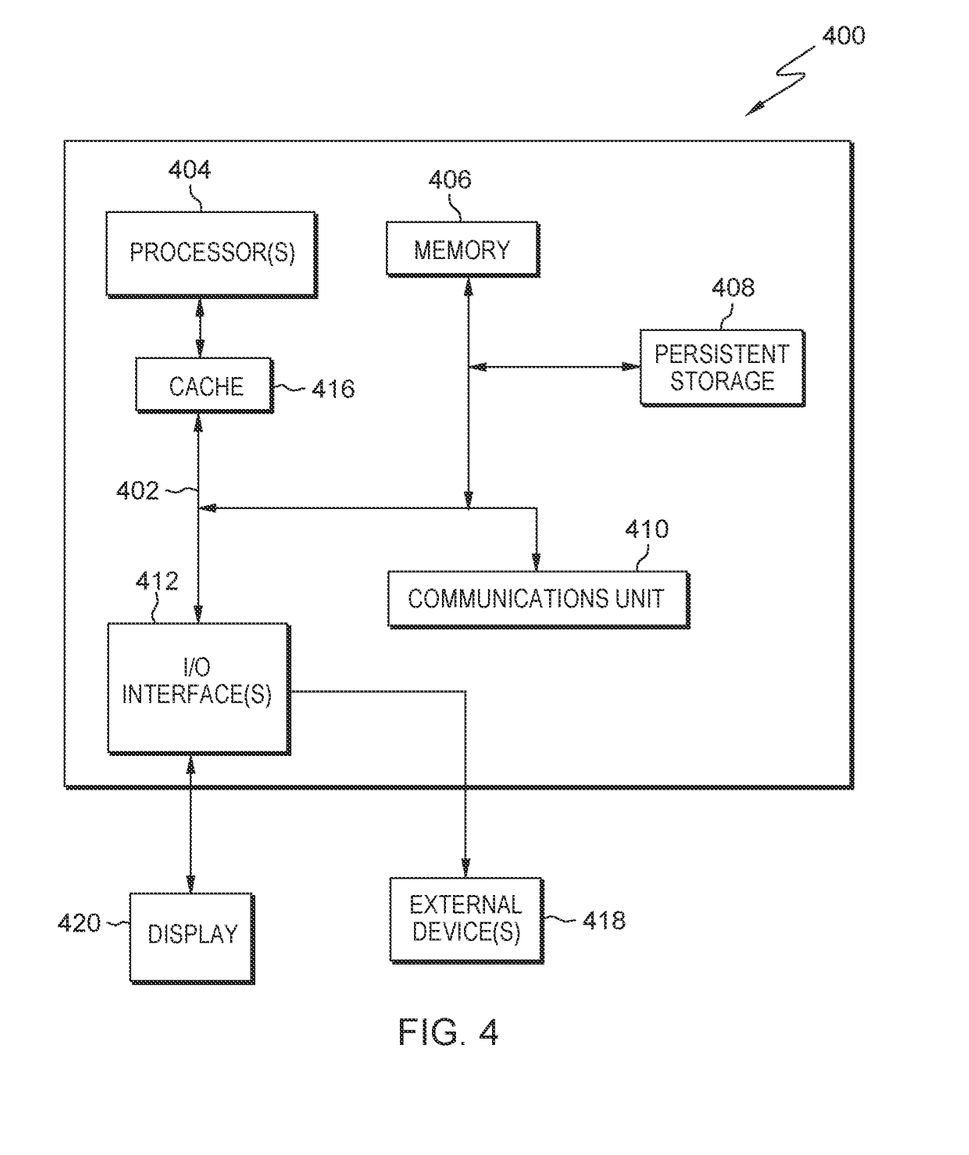
FIG. 4 is a block diagram of the components of a computing device of the distributed data processing environment of FIG. 1, in accordance with an embodiment of the present invention.

FIG. 4 is a block diagram of the components of computing device 400, suitable for server 120 and/or user computing device 130 in distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410, includes one or more network interface cards. Communications unit 410, may provide communications through the use of either or both physical and wireless communications links. Programs may be downloaded to persistent storage 308 through communications unit 410.

I/O interface(s) 412 allows for input and output of data with other devices that may be connected to server 120 and/or user computing device 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    ascertaining, by one or more processors, a known historical date of planting for one or more crops growing in one or more agricultural fields in a pre-determined geographical region from a set of field data to produce a plurality of historical reference signatures;
    receiving, by the one or more processors, an aerial image of the one or more agricultural fields in the pre-determined geographical region;
    calculating, by the one or more processors, a Vegetation Index of the one or more crops growing at a plurality of points selected across the one or more agricultural fields;
    comparing, by the one or more processors, the Vegetation Index calculated for the one or more crops growing at the plurality of points selected across the one or more agricultural fields to the Vegetation Index known for the plurality of historical reference signatures to determine whether a change occurred in the Vegetation Index of the one or more crops growing at the plurality of points selected across the one or more agricultural fields;
    generating, by the one or more processors, an actual signature for the one or more crops growing at the plurality of points selected across the one or more agricultural fields based on the change in the Vegetation Index;
    cross-correlating, by the one or more processors, the actual signature against the plurality of historical reference signatures to measure a degree of similarity between the actual signature and the plurality of historical reference signatures, wherein:
        the cross-correlation of the actual signature against the plurality of historical reference signatures is defined as $(f^*g)(\tau) \triangleq \int_{-\infty}^{\infty} \overline{f(t)} g(t+\tau) dt$;
        $\overline{f(t)}$ denotes the complex conjugate of $f(t)$; and
        $\tau$ is a displacement; and
    determining, by the one or more processors, a date of planting of the one or more crops growing at the plurality of points selected across the one or more agricultural fields based on the cross-correlation.

2. The computer-implemented method of claim 1, further comprising:
    prior to receiving the aerial image, receiving, by the one or more processors, the one or more agricultural fields in the pre-determined geographical region inputted into a control file by a user through a user interface of a user computing device;
    receiving, by the one or more processors, a specified period of time inputted into the control file by the user through the user interface of the user computing device;
    processing, by the one or more processors, the control file;
    gathering, by the one or more processors, field data recorded for the one or more agricultural fields in the pre-determined geographical region; and
    grouping, by the one or more processors, the field data recorded for the one or more agricultural fields in the pre-determined geographical region by crop type.

3. The computer-implemented method of claim 1, further comprising:
    subsequent to receiving the aerial image of the one or more agricultural fields in the pre-determined geographical region, selecting, by the one or more processors, the plurality of points from the aerial image across the one or more agricultural fields in the pre-determined geographical region;
    clipping, by the one or more processors, the aerial image into one or more smaller images isolating the plurality of points selected across the one or more agricultural fields in the pre-determined geographical region;
    generating, by the one or more processors, one or more observed signatures from the one or more smaller images isolating the plurality of points selected across the one or more agricultural fields in the pre-determined geographical region; and
    processing, by the one or more processors, the one or more observed signatures.

4. The computer-implemented method of claim 1, further comprising:
    prior to determining the date of planting of the one or more crops growing at the plurality of points selected across the one or more agricultural fields based on the cross-correlation, calculating, by the one or more processors, a phase offset of the one or more crops identified as growing in the one or more agricultural fields in the pre-determined geographical region;
    outputting, by the one or more processors, information on the one or more crops identified as growing in the one or more agricultural fields in the pre-determined geographical region and an estimated date of planting of the one or more crops identified as growing in the one or more agricultural fields in the pre-determined geographical region; and
    storing, by the one or more processors, the information on the one or more crops identified as growing in the one or more agricultural fields in the pre-determined geographical region and the estimated date of planting of the one or more crops identified as growing in the one or more agricultural fields in the pre-determined geographical region in a database.

5. The computer-implemented method of claim 1, wherein the aerial image of the one or more agricultural fields in the pre-determined geographical region is received from an optical Earth observation satellite or a non-optical Earth observation satellite at a pre-determined interval of time during a growing season of the one or more crops.

6. The computer-implemented method of claim 1, wherein the Vegetation Index is selected from the group consisting of a Normalized Difference Vegetation Index and an Enhanced Vegetation Index.

7. The computer-implemented method of claim 1, wherein cross-correlating the actual signature against the plurality of historical reference signatures to measure the degree of similarity between the actual signature and the plurality of historical reference signatures further comprises:
    producing, by the one or more processors, a value from the cross-correlation of the actual signature against the plurality of historical reference signatures; and
    producing, by the one or more processors, a phase angle from the cross-correlation of the actual signature against the plurality of historical reference signatures.

8. The computer-implemented method of claim 7, wherein the value produced from the cross-correlation of the actual signature against the plurality of historical reference signatures ranges from zero to one, wherein zero indicates no correlation and one indicates complete correlation between the actual signature and the plurality of historical reference signatures.

9. The computer-implemented method of claim 7, wherein the phase angle produced from the cross-correlation of the actual signature against the plurality of historical reference signatures is equal to a degree of shift, which indicates a number of days separating an estimated date of planting of the actual signature and an estimated date of planting of the plurality of historical reference signatures.

10. The computer-implemented method of claim 1, wherein the one or more crops identified as the one or more crops growing in the one or more agricultural fields in the pre-determined geographical region is a highest ranked cross-correlation product.

11. The computer-implemented method of claim 4, wherein the phase offset calculated for the one or more crops identified as growing in the one or more agricultural fields in the pre-determined geographical region is equal to how much the actual signature of the one or more crops identified as the one or more crops growing in the one or more agricultural fields in the pre-determined geographical region needs to be shifted with respect to the historical reference signature to achieve a highest correlation coefficient.

12. The computer-implemented method of claim 1, further comprising:
subsequent to cross-correlating the actual signature against the plurality of historical reference signatures to measure the degree of similarity between the actual signature and the plurality of historical reference signatures, ranking, by the one or more processors, one or more products of a cross-correlation of the actual signature against the plurality of historical reference signatures; and
identifying, by the one or more processors, the one or more crops growing in the one or more agricultural fields in the pre-determined geographical region from the cross-correlation of the actual signature against the plurality of historical reference signatures.

13. A computer program product comprising:
one or more computer readable storage media and program instructions stored on the one or more computer readable storage media, the program instructions comprising:
program instructions to ascertain a known historical date of planting for one or more crops growing in one or more agricultural fields in a pre-determined geographical region from a set of field data to produce a plurality of historical reference signatures;
program instructions to receive an aerial image of the one or more agricultural fields in the pre-determined geographical region;
program instructions to calculate a Vegetation Index of the one or more crops growing at a plurality of points selected across the one or more agricultural fields;
program instructions to compare the Vegetation Index calculated for the one or more crops growing at the plurality of points selected across the one or more agricultural fields to the Vegetation Index known for the plurality of historical reference signatures to determine whether a change occurred in the Vegetation Index of the one or more crops growing at the plurality of points selected across the one or more agricultural fields;
program instructions to generate an actual signature for the one or more crops growing at the plurality of points selected across the one or more agricultural fields based on the change in the Vegetation Index;
program instructions to cross-correlate the actual signature against the plurality of historical reference signatures to measure a degree of similarity between the actual signature and the plurality of historical reference signatures, wherein:
the cross-correlation of the actual signature against the plurality of historical reference signatures is defined as $(f*g)(\tau) \triangleq \int_{-\infty}^{\infty} \overline{f(t)} g(t+\tau) dt$;
$\overline{f(t)}$ denotes the complex conjugate of $f(t)$, and
$\tau$ is a displacement; and
program instructions to determine a date of planting of the one or more crops growing at the plurality of points selected across the one or more agricultural fields based on the cross-correlation.

14. The computer program product of claim 13, further comprising: prior to receiving the aerial image, program instructions to receive the one or more agricultural fields in the pre-determined geographical region inputted into a control file by a user through a user interface of a user computing device;
program instructions to receive a specified period of time inputted into the control file by the user through the user interface of the user computing device;
program instructions to process the control file;
program instructions to gather field data recorded for the one or more agricultural fields in the pre-determined geographical region; and
program instructions to group the field data recorded for the one or more agricultural fields in the pre-determined geographical region by crop type.

15. The computer program product of claim 13, further comprising:
subsequent to program instructions to receive the aerial image of the one or more agricultural fields in the pre-determined geographical region, program instructions to select a plurality of points from the aerial image across the one or more agricultural fields in the pre-determined geographical region;
program instructions to clip the aerial image into one or more smaller images isolating the plurality of points selected across the one or more agricultural fields in the pre-determined geographical region;
program instructions to generate one or more observed signatures from the one or more smaller images isolating the plurality of points selected across the one or more agricultural fields in the pre-determined geographical region; and
program instructions to process the one or more observed signatures.

16. The computer program product of claim 13, further comprising:
prior to program instructions to determine the date of planting of the one or more crops growing at the plurality of points selected across the one or more agricultural fields based on the cross-correlation, program instructions to calculate a phase offset of the one or more crops identified as growing in the one or more agricultural fields in the pre-determined geographical region;
program instructions to output information on the one or more crops identified as growing in the one or more agricultural fields in the pre-determined geographical region and an estimated date of planting of the one or more crops identified as growing in the one or more agricultural fields in the pre-determined geographical region; and
program instructions to store the information on the one or more crops identified as growing in the one or more agricultural fields in the pre-determined geographical region and the estimated date of planting of the one or more crops identified as growing in the one or more agricultural fields in the pre-determined geographical region in a database.

17. A computer system comprising:
one or more computer processors;
one or more computer readable storage media;
program instructions collectively stored on the one or more computer readable storage media for execution by at least one of the one or more computer processors, the stored program instructions comprising:
program instructions to ascertain a known historical date of planting for one or more crops growing in one or more agricultural fields in a pre-determined geographical region from a set of field data to produce a plurality of historical reference signatures;
program instructions to receive an aerial image of the one or more agricultural fields in the pre-determined geographical region;
program instructions to calculate a Vegetation Index of the one or more crops growing at a plurality of points selected across the one or more agricultural fields;
program instructions to compare the Vegetation Index calculated for the one or more crops growing at the plurality of points selected across the one or more agricultural fields to the Vegetation Index known for the plurality of historical reference signatures to determine whether a change occurred in the Vegetation Index of the one or more crops growing at the plurality of points selected across the one or more agricultural fields;
program instructions to generate an actual signature from one or more observed signatures for the one or more crops growing at the plurality of points selected across the one or more agricultural fields based on the change in the Vegetation Index;
program instructions to cross-correlate the actual signature against the plurality of historical reference signatures to measure a degree of similarity between the actual signature and the plurality of historical reference signatures, wherein:
the cross-correlation of the actual signature against the plurality of historical reference signatures is defined as $(f*g)(\tau) \triangleq \int_{-\infty}^{\infty} \overline{f(t)} g(t+\tau) dt$;
$\overline{f(t)}$ denotes the complex conjugate of $f(t)$, and
$\tau$ is a displacement; and
program instructions to determine a date of planting of the one or more crops growing at the plurality of points selected across the one or more agricultural fields based on the cross-correlation.

18. The computer system of claim 17, further comprising:
prior to receiving the aerial image, program instructions to receive the one or more agricultural fields in the pre-determined geographical region inputted into a control file by a user through a user interface of a user computing device;
program instructions to receive a specified period of time inputted into the control file by the user through the user interface of the user computing device;
program instructions to process the control file;
program instructions to gather field data recorded for the one or more agricultural fields in the pre-determined geographical region; and
program instructions to group the field data recorded for the one or more agricultural fields in the pre-determined geographical region by crop type.

19. The computer system of claim 17, further comprising:
subsequent to program instructions to receive the aerial image of the one or more agricultural fields in the pre-determined geographical region, program instructions to select a plurality of points from the aerial image across the one or more agricultural fields in the pre-determined geographical region;
program instructions to clip the aerial image into one or more smaller images isolating the plurality of points selected across the one or more agricultural fields in the pre-determined geographical region;
program instructions to generate one or more observed signatures from the one or more smaller images isolating the plurality of points selected across the one or more agricultural fields in the pre-determined geographical region; and
program instructions to process the one or more observed signatures.

20. The computer system of claim 17, further comprising:
prior to program instructions to determine the date of planting of the one or more crops growing at the plurality of points selected across the one or more agricultural fields based on the cross-correlation, program instructions to calculate a phase offset of the one or more crops identified as growing in the one or more agricultural fields in the pre-determined geographical region;
program instructions to output information on the one or more crops identified as growing in the one or more agricultural fields in the pre-determined geographical region and an estimated date of planting of the one or more crops identified as growing in the one or more agricultural fields in the pre-determined geographical region; and
program instructions to store the information on the one or more crops identified as growing in the one or more agricultural fields in the pre-determined geographical region and the estimated date of planting of the one or more crops identified as growing in the one or more agricultural fields in the pre-determined geographical region in a database.

* * * * *